Nov. 17, 1942.                P. F. COVINGTON                2,302,191
                                 FISHING ROD
                              Filed Oct. 30, 1940
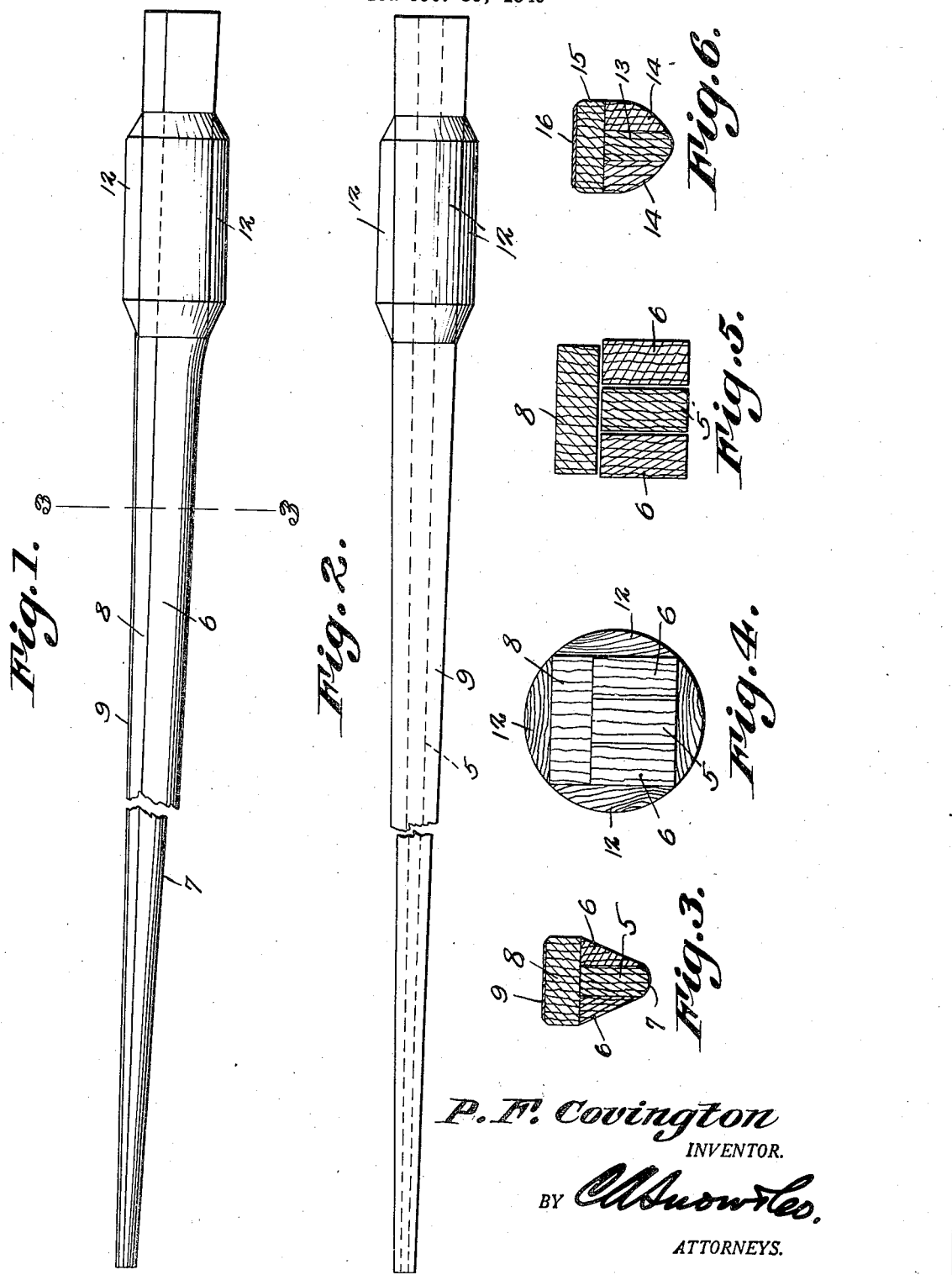
P. F. Covington
INVENTOR.
BY
ATTORNEYS.

Patented Nov. 17, 1942

2,302,191

UNITED STATES PATENT OFFICE 2,302,191

FISHING ROD

Paul F. Covington, Miami, Fla.

Application October 30, 1940, Serial No. 363,559

1 Claim. (Cl. 43—18)

This invention relates to fishing rod construction, the primary object of the invention being to provide a fishing rod made entirely of wood sections, the wood of which the sections are formed, being selected for its uniformity of texture and flexibility throughout its length, thereby providing a fishing rod which will be exceptionally strong and durable for deep water fishing.

An important object of the invention is to provide a fishing rod made up of a plurality of sections constructed in such a manner and secured together in such a way that one section will be braced by the adjacent section, lending flexibility to the structure, and at the same time eliminating any possibility of the rod splitting, due to constant use.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a side elevational view of a fishing rod constructed in accordance with the invention.

Figure 2 is a plan view thereof.

Figure 3 is a sectional view taken on line 3—3 of Figure 1.

Figure 4 is an end view of the rod.

Figure 5 is a transverse sectional view illustrating the sections of which the rod is constructed, prior to the gluing or securing of the sections together.

Figure 6 is a transverse sectional view through a further modified form of the invention.

Referring to the drawing in detail, the rod comprises a body portion including a central section 5 and lateral sections 6, the sections having their adjacent surfaces secured together as by gluing.

The outer surfaces of the sections 6 are beveled, as clearly shown by Figure 3 of the drawing, and form continuations of the rounded edge 7 of the central section. The upper surfaces of the sections 5 and 6 are flat to accommodate the upper section 8, which is of a width to extend across the entire upper surfaces of the sections 5 and 6. The adjacent surfaces of the sections 5, 6 and 8, are glued together, thereby bracing the sections 5 and 6 to restrict to a degree, lateral bending of the rod.

On the upper surface of the section 8, is secured a strip of raw hide material indicated at 9, the strip of raw hide material extending throughout the length of the rod, and being of a width to cover the entire surface of the upper section 8. It has been found in practice that a raw hide backing strip such as shown and described, will cause the rod to assume its natural or straight position after strain which has been directed thereto to bend the rod, has been relieved, to the end that the rod will be maintained straight against setting, due to constant use and being constantly bent in one direction.

As shown by Figure 4 of the drawing, the handle is formed of a plurality of sections 12 which have squared inner surfaces that are positioned against the squared faces of the body portion. The outer surfaces of the sections 12 are curved, so that when the sections 12 have been properly positioned against the body portion, the cross-sectional construction of the handle will be circular.

As shown by Figure 6 of the drawing, the body portion of the rod comprises an inner section 13 and lateral sections 14, the sections 14 having their lower outer edges curved, providing a body portion which is exceptionally strong. The adjacent surfaces of the sections 13 and 14 are glued together. An upper section 15 has its lower surface squared and fitted against the upper surfaces of the sections 13 and 14, when it is glued in position, bracing the sections 13 and 14 against lateral strains. In this form of the invention a raw hide strip 16 is provided and positioned on the upper surface of the section 16.

From the foregoing it will be seen that due to the construction shown and described, and because the sections of which the rod are formed are made up of lengths of wood of a uniform texture, the rod is one which will be exceptionally strong and at the same time possess exceptionally flexible qualities.

In view of the fact that a layer of raw hide material is secured along the upper surface of the uppermost section of the rod, the setting of the rod, due to excessive use, will be prevented.

What is claimed is:

A fishing rod construction comprising side sections having beveled outer surfaces beveled inwardly toward the lower edges thereof and having straight inner surfaces, a central section having straight side surfaces, secured against the straight inner surfaces of the side sections, the upper edges of the side and central sections being straight and flush, an upper section of a width equal to the combined width of the side and central sections, and the bottom surface of the upper section being secured to the upper surfaces of the side and central sections.

PAUL F. COVINGTON.